United States Patent
Sugano et al.

(10) Patent No.: US 10,030,769 B2
(45) Date of Patent: Jul. 24, 2018

(54) GEARBOX OF POWER UNIT

(71) Applicant: HONDA MOTOR CO., LTD., Tokyo (JP)

(72) Inventors: Takeshi Sugano, Wako (JP); Akira Tokito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 267 days.

(21) Appl. No.: 15/206,466

(22) Filed: Jul. 11, 2016

(65) Prior Publication Data

US 2017/0023134 A1   Jan. 26, 2017

(30) Foreign Application Priority Data

Jul. 23, 2015 (JP) .................... 2015-145478

(51) Int. Cl.
| | | |
|---|---|---|
| *B60K 20/00* | (2006.01) | |
| *F16H 59/04* | (2006.01) | |
| *F16H 63/18* | (2006.01) | |
| *F16H 63/32* | (2006.01) | |
| *F16H 3/091* | (2006.01) | |

(52) U.S. Cl.
CPC ............ *F16H 63/18* (2013.01); *F16H 3/091* (2013.01); *F16H 63/32* (2013.01); *F16H 2063/322* (2013.01)

(58) Field of Classification Search
CPC ............ F16H 3/006; F16H 3/02; F16H 59/02
USPC ................ 74/330, 335, 337.5, 473.3, 473.36
See application file for complete search history.

(56) References Cited

U.S. PATENT DOCUMENTS

| | | | | |
|---|---|---|---|---|
| 8,844,394 | B2 * | 9/2014 | Tokito | F16H 59/70 |
| | | | | 74/337.5 |
| 9,175,765 | B2 * | 11/2015 | Ikeya | F16H 63/502 |
| 9,212,737 | B2 * | 12/2015 | Nakamura | F16D 21/02 |
| 9,383,011 | B2 * | 7/2016 | Tetsuka | F16H 59/70 |
| 9,638,320 | B2 * | 5/2017 | Hotei | F16H 63/18 |
| 9,945,477 | B2 * | 4/2018 | Nakamura | F16H 61/32 |

FOREIGN PATENT DOCUMENTS

| | | |
|---|---|---|
| JP | S57-154548 A | 9/1982 |
| JP | 2008-298089 A | 12/2008 |
| JP | 4906596 B | 3/2012 |

* cited by examiner

*Primary Examiner* — Ha Dinh Ho
(74) *Attorney, Agent, or Firm* — Rankin, Hill & Clark LLP

(57) ABSTRACT

A gearbox of a power unit includes a transmission, a shift drum provided with lead grooves, a shift drum feed mechanism, and a drive side-shift fork and driven side-shift forks respectively provided with engaging portions to be engaged with the lead grooves. At least one lead groove is a common lead groove with which the engaging portion of the drive side-shift fork and the engaging portion of the driven side-shift fork are engaged at an angular interval, which is a positive multiple integral of a feed angle of the shift drum, with respect to a rotation center of the shift drum. The drive side-shift fork and driven side-shift fork, whose engaging portions are engaged with the common lead groove, are guided by the same axially shifted groove portions provided in the common lead groove, and thereby establish speeds of the transmission.

8 Claims, 12 Drawing Sheets

GEARBOX OF POWER UNIT

BACKGROUND OF THE INVENTION

Field of the Invention

The present invention relates to a gearbox of a power unit that can be downsized, and includes a transmission, a shift drum provided with lead grooves, and multiple shift forks engaging with the lead grooves.

Description of Related Art

Japanese Patent No. 4906596 discloses a structure of a gearbox of a power unit aimed to downsize an internal combustion engine (power unit), which includes a gearbox having a transmission and other parts. The gearbox includes a constant mesh gear transmission as a shift mechanism and a shift drive mechanism, which includes a shift drum and shift forks, configured to drive the shift mechanism. In the shift drive mechanism, shift pins of two shift forks, which sandwich the shift drum in the longitudinal direction, are both engaged with one of lead grooves formed on the outer surface of the shift drum. For this reason, there is no need to provide a lead groove for each shift fork. Hence, the number of lead grooves in the shift drum can be reduced, whereby the axial length of the shift drum is shortened, and the entire power unit is downsized.

The lead groove of the shift drum is provided with a circumferential groove portion extending along the circumferential direction of the shift drum, and axially shifted groove portions that are shifted in the axial direction of the shift drum from the circumferential groove portion. When the shift drum is rotated, the shift forks are guided by the lead groove to move in the axial direction of the shift drum, and establish speeds of the transmission.

In the structure disclosed in Japanese Patent No. 4906596, the two shift pins engaging with the single lead groove are guided by the same circumferential groove portion. Meanwhile, the axially shifted groove portions for guiding the two shift pins are provided in positions shifted in different directions, and the two shift pins do not share a single axially shifted groove portion in the structure. Hence, axially shifted groove portions for moving the respective shift forks are provided separately in the lead groove, which inhibits downsizing of the shift drum in the radial direction. Accordingly, there still remains room for improvement in downsizing of a gearbox including a shift drum, and downsizing of an internal combustion engine (power unit) including the gearbox.

SUMMARY OF THE INVENTION

The present invention is directed toward providing a gearbox of a power unit, in which the gearbox including a shift drum is downsized to enable downsizing of the power unit.

In accordance with the present invention, a gearbox of a power unit includes a constant mesh transmission including a main shaft, a counter shaft having a shaft axis arranged parallel to a shaft axis of the main shaft, multiple drive gears provided on the main shaft, and multiple driven gears meshing with the multiple drive gears and provided on the counter shaft, a cylindrical shift drum having lead grooves formed on a drum outer surface, and having a rotation center line arranged parallel to the shaft axis of the main shaft and the shaft axis of the counter shaft, a shift drum feed mechanism for rotating the shift drum at a predetermined feed angle, a drive shifter provided on the main shaft so as to be movable in the axial direction of the main shaft, and freely engageable with and disengageable from at least one of the drive gears adjacent thereto, among the drive gears. Further, driven shifters are provided on the counter shaft so as to be movable in the axial direction of the counter shaft, and freely engageable with and disengageable from at least one of the driven gears adjacent thereto, among the driven gears. Also, a drive side-shift fork has an engaging portion engaging with the lead groove, and guided by the lead groove to move the drive shifter in the axial direction of the main shaft, and driven side-shift forks have engaging portions engaging with the lead groove, and guided by the lead grooves to move the driven shifters in the axial direction of the counter shaft. The drive side-shift fork and the driven side-shift forks are arranged on one side of a plane, which passes through the shaft axis of the main shaft and the shaft axis of the counter shaft, the shift drum is arranged between the drive side-shift fork and the driven side-shift forks when viewed in the axial direction of the shift drum, the lead grooves include circumferential groove portions extending in the circumferential direction of the shift drum, and axially shifted groove portions continuous with the circumferential groove portions, and shifted in the axial direction of the shift drum from the circumferential groove portions. At least one of the lead grooves is a common lead groove, with which the drive side-shift fork and the driven side-shift fork are engaged. The engaging portion of the drive side-shift fork and the engaging portion of the driven side-shift fork engaged with the common lead groove are engaged at an angular interval, which is a positive multiple integral of the feed angle, with respect to a rotation center of the shift drum. The drive side-shift fork engaged with the common lead groove and the driven side-shift fork engaged with the common lead groove are guided by the same axially shifted groove portion of the axially shifted groove portions, and thereby establish speeds of the transmission.

According to this configuration, the engaging portions of the two shift forks are engaged with a single common lead groove, so that the axial length of the shift drum can be shortened. Moreover, in this configuration, speeds of the transmission are established by sharing a single axially shifted groove portion of a single lead groove between both engaging portions of the two shift forks. This eliminates the need to provide separate axially shifted groove portions for each of the shift forks in the common lead groove. Hence, the length of the common lead groove can be shortened, and the diameter of the shift drum can be reduced, whereby the shift drum can be downsized to downsize the gearbox and power unit.

In the above configuration, of the drive shifters, the drive shifter, which is moved by the drive side-shift fork engaged with the common lead groove, may be guided by the axially shifted groove portion provided in the common lead groove, and be engaged with the drive gear adjacent thereto on one side in the axial direction of the main shaft. Of the driven shifters, the driven shifter, which is moved by the driven side-shift fork engaged with the common lead groove, may be guided by the same axially shifted groove portion as the axially shifted groove portion that guides the drive shifter, and be engaged with the driven gear adjacent thereto in the same direction as the one side in the axial direction of the main shaft, in the axial direction of the counter shaft.

According to this configuration, the drive shifter moved by the drive side-shift fork engaged with the common lead groove and the driven shifter moved by the driven side-shift fork engaged with the common lead groove, are guided by the same axially shifted groove portion to be respectively engaged with the drive gear and driven gear, which are adjacent to the shifters in the same axial direction. Hence, the drive shifter and the driven shifter move within the same area in the axial direction, so that the axial length of the transmission can be shortened, and the gearbox and power unit can be downsized even more.

In the above configuration, the shift drum feed mechanism may be arranged on one side in the axial direction of the shift drum, and the common lead groove may be provided closer to the shift drum feed mechanism than the other lead groove, in the axial direction of the shift drum.

According to this configuration, the distance between the shift drum feed mechanism and the common lead groove, on which a large load is applied due to engaging of multiple engaging portions, is reduced. This reduces torsional stress of the shift drum, whereby the shift drum can be made lighter, and the click stop feeling during the shifting operation can be improved.

In the above configuration, the gearbox of a power unit may include a case member accommodating the transmission, the shift drum, the shift drum feed mechanism, the drive side-shift fork, and the driven side-shift forks. The shift drum may have both end parts in the axial direction of the shift drum rotatably supported to the case member through a bearing member. Also, the bearing member may be arranged between the drum outer surface of the shift drum and an inner surface of the case member.

According to this configuration, since the shift drum has the drum outer surface of its both end parts in the axial direction of the shift drum rotatably supported to the inner surface of the case member, through the bearing member, there is no need to provide a separate supporting part in the shift drum, so that the shift drum can be downsized even more, and the gearbox and power unit can be downsized even more.

In the above configuration, at least one of the drive side-shift fork and the driven side-shift forks may be formed integrally with the engaging portion, and have a shaft portion supported in an axially slidable manner.

According to this configuration, one of the drive side-shift fork and the driven side-shift forks has the shaft portion formed integrally with the engaging portion, and the shaft portion supports the shift fork directly. Hence, the need for a shift fork shaft is eliminated, and a distance between the shaft axis of the shaft portion and the rotation center line of the shift drum can be made shorter, than a distance between the shaft axis of the shift fork shaft and the rotation center line of the shift drum. With this, the shift fork can be arranged close to the shift drum, and the shift fork does not require space for inserting a shift fork shaft. Accordingly, the shift fork itself can be downsized, and the gearbox and power unit can be downsized even more.

According to the present invention, the shift drum can be reduced in length and diameter, so that the shift drum can be downsized to downsize the gearbox and power unit.

BRIEF DESCRIPTION OF THE DRAWINGS

These and further features of the invention will be apparent with reference to the following description and drawings, wherein.

DETAILED DESCRIPTION OF THE INVENTION

A gearbox 4 of a power unit 1 of an embodiment of the present invention will be described, with reference to FIGS. 1 to 12.

Figure 1:
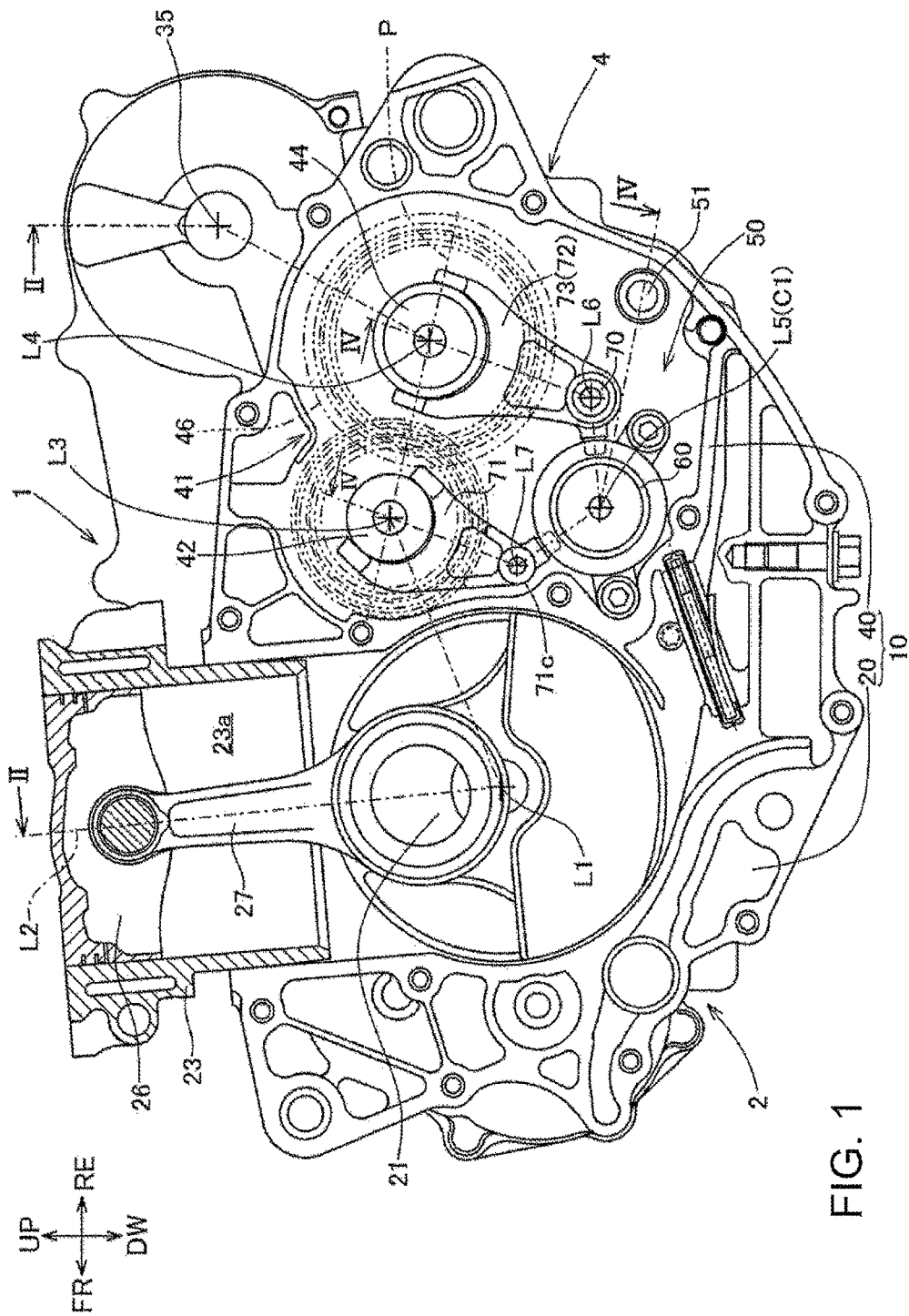
FIG. 1 is a left side view, in which a power unit including a gearbox of an embodiment of the present invention is partially omitted and partially shown in cross section.

The power unit 1 of the embodiment is installed in a vehicle such as a motorcycle (not shown). As shown in FIG. 1, the power unit 1 includes: a water-cooled single-cylinder four-stroke internal combustion engine (hereinafter simply referred to as "internal combustion engine 2"); and a gearbox 4 connected to the rear of the internal combustion engine 2, and changing the drive power of the internal combustion engine 2 to predetermined speeds. The power unit is installed in the vehicle, such that a rotation center line L1 of a crankshaft 21 is oriented in the lateral direction of the vehicle. Note that directions such as front and rear, right and left, and upper and lower in the description of the specification are based on the direction of the motorcycle, and arrow FR indicates the front, RE the rear, LT the left, RT the right, UP the upper, and DW the lower, respectively, in the drawings.

Figure 2:
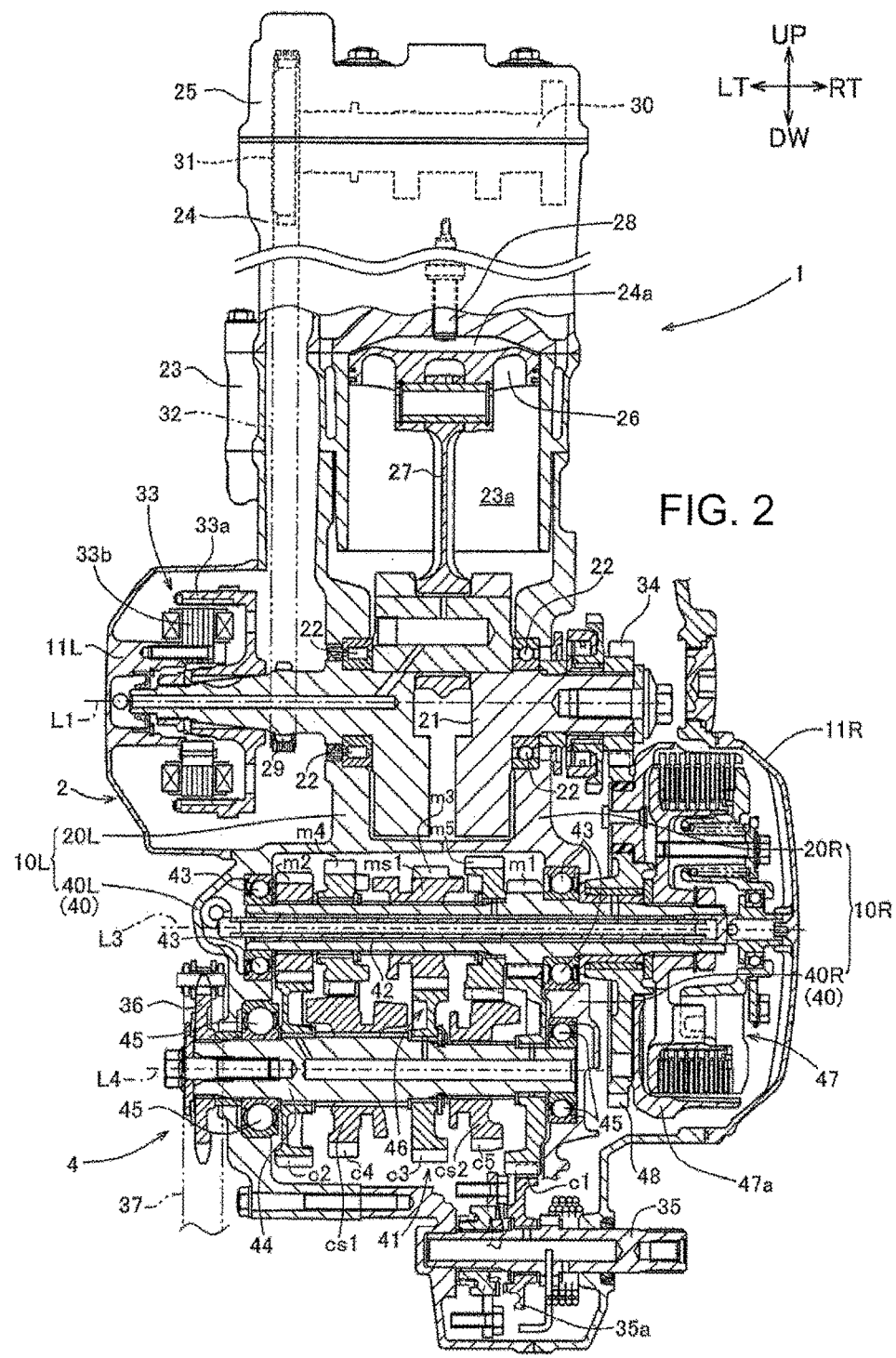
FIG. 2 is a cross-sectional view taken along line II-II of FIG. 1.

As shown in FIGS. 1 and 2, the power unit 1 includes a unit case 10, in which a crankcase 20 rotatably supporting the crankshaft 21 and a transmission case 40 accommodating a transmission 41 of the gearbox 4 are integrated in the longitudinal direction, such that the crankcase 20 is the front half part and the transmission case 40 is the rear half part. The unit case 10 is configured of left and right parts including: a left unit case half body 10L in which a left crankcase half body 20L and a left transmission case half body 40L are formed as one body; and a right unit case half body 10R in which a right crankcase half body 20R and a right transmission case half body 40R are formed as one body.

As shown in FIG. 1, a cylinder block 23 having a cylinder bore 23a in its center protrudes from an upper part of the crankcase 20, with a cylinder axis L2 as the centerline of the cylinder bore 23a tilted slightly frontward. As shown in FIG. 2, a cylinder head 24 and a head cover 25 are stacked in this order on the cylinder block 23. A left unit case cover 11L covers the left side of the unit case 10. A right unit case cover 11R covers the right side of the unit case 10.

As shown in FIG. 2, a piston 26 is fitted into the cylinder bore 23a of the cylinder block 23, to be slidable in a reciprocating manner. The piston 26 is connected to the crankshaft 21 through a connecting rod 27. The cylinder head 24 has a combustion chamber 24a formed opposite to the piston 26, and a spark plug 28 attached to face the combustion chamber 24a.

The crankshaft 21 is rotatably supported to the left crankcase half body 20L and right crankcase half body 20R (i.e., crankcase 20) through a main bearing 22, with the rotation center line L1 oriented in the lateral direction.

A drive cam chain sprocket 29 is provided on a left side part of the crankshaft 21, which extends to the left from the main bearing 22 of the left crankcase half body 20L. A timing chain 32 is wound around the drive cam chain sprocket 29 and a driven cam chain sprocket 31, which is fitted into a cam shaft 30 of the cylinder head 24. An outer rotor 33a of an AC generator 33 is fitted into a left end part of the crankshaft 21. The left unit case cover 11L, to which an inner stator 33b of the AC generator 33 is supported, covers the left of the outer rotor 33a. The inner stator 33b is arranged on the inner side of the outer rotor 33a. A primary drive gear 34 is fitted into a right end part of the crankshaft 21, which extends to the right of the right crankcase half body 20R.

As shown in FIGS. 1 and 2, the gearbox 4 that changes the drive power of the internal combustion engine 2 to predetermined speeds includes a transmission case 40, a constant mesh transmission 41, a hydraulic clutch 47, and a shift control mechanism 50 for controlling speeds of the transmission 41.

The transmission 41 includes a main shaft 42, a counter shaft 44, and a gear group 46 provided on the main shaft 42 and the counter shaft 44.

As shown in FIGS. 1 and 2, the main shaft 42 is arranged in the rear slightly upper direction of the crankshaft 21, such that the rotation center line L1 of the crankshaft 21 and a shaft axis L3 of the main shaft 42 are parallel to each other. The main shaft is rotatably supported to the transmission case 40 through a bearing 43. The counter shaft 44 is arranged behind the main shaft 42, such that the shaft axis L3 of the main shaft 42 and a shaft axis L4 of the counter shaft 44 are parallel to each other. The counter shaft is rotatably supported to the transmission case 40 through a bearing 45.

Figure 3:
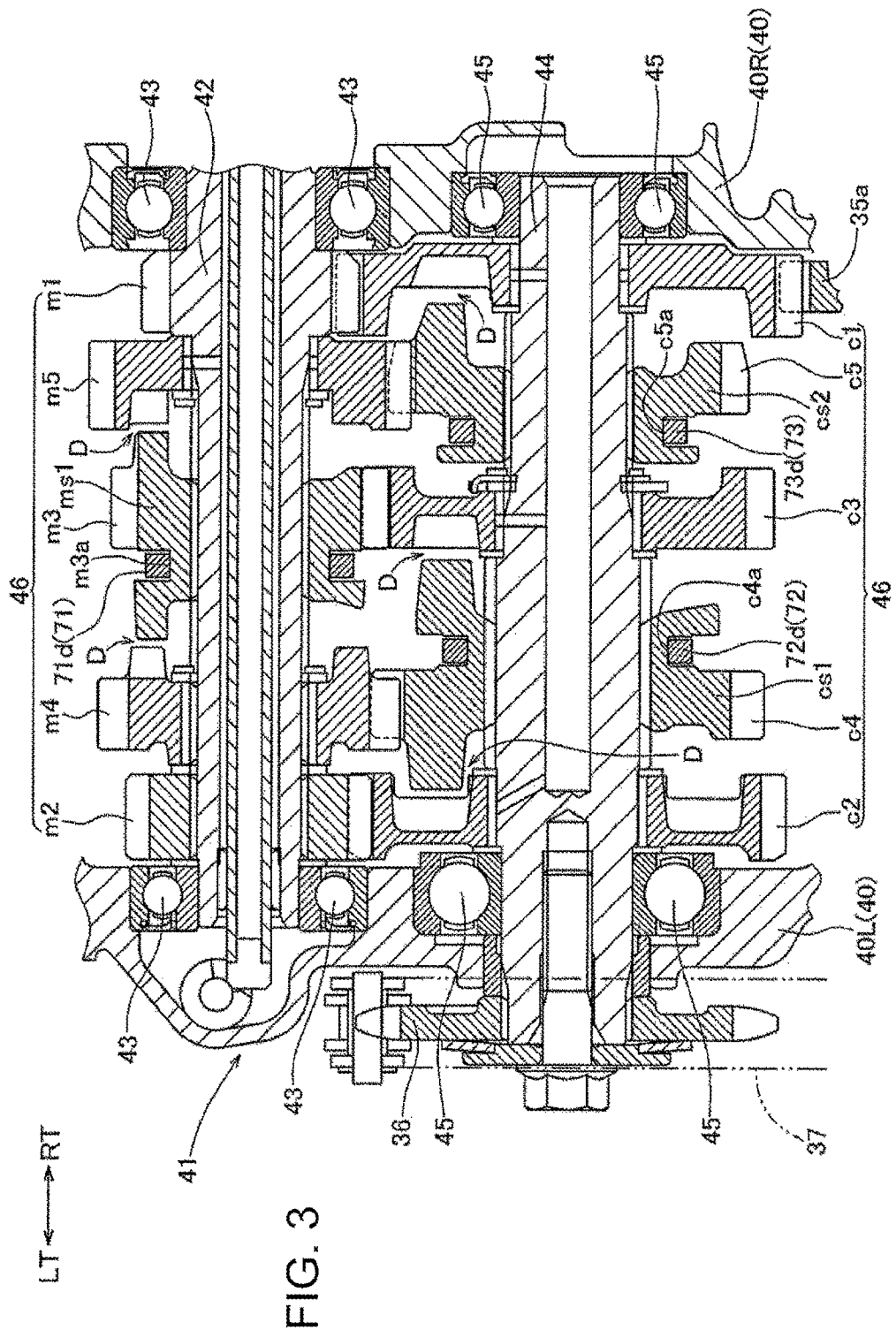
FIG. 3 is an enlarged cross-sectional view of a transmission of FIG. 2.

As shown in FIG. 3, five drive gears m1 to m5 of first to fifth gear ratios are provided on the main shaft 42. Five driven gears c1 to c5 of first to fifth gear ratios are provided on the counter shaft 44. Gears corresponding to first, fifth, third, fourth, and second speed of the drive gears m1 to m5 and driven gears c1 to c5 are arranged in this order from the right side to mesh with each other, and these drive gears m1 to m5 and driven gears c1 to c5 constitute the gear group 46.

The third drive gear m3 is a first drive shifter ms1, which is spline-fitted to the main shaft 42 to rotate integrally with the main shaft 42 and be movable in the axial direction (lateral direction in the embodiment) of the main shaft 42. The fourth drive gear m4 and fifth drive gear m5 adjacent to the left and right sides of the first drive shifter ms1, respectively, are free gears, which are rotatable relative to the main shaft 42, and fixed to be immovable in the axial direction of the main shaft 42. The first drive gear m1 and second drive gear m2 are fixed gears, which rotate integrally with the main shaft 42, and are fixed to be immovable in the axial direction of the main shaft 42.

The fourth driven gear c4 and fifth driven gear c5 are a first driven shifter cs1 and second driven shifter cs2, which are spline-fitted to the counter shaft 44 to rotate integrally with the counter shaft 44 and be movable in the axial direction (lateral direction in the embodiment) of the counter shaft 44. The second driven gear c2 and third driven gear c3 adjacent to the left and right of the first driven shifter cs1, respectively, and the first driven gear c1 adjacent to the right side of the second driven shifter cs2, are free gears, which are rotatable relative to the counter shaft 44, and fixed to be immovable in the axial direction of the counter shaft 44.

A dog clutch D configured to enable engaging and disengaging of the gears is provided, between the first drive shifter ms1 and fourth drive gear m4, the first drive shifter ms1 and fifth drive gear m5, the first driven shifter cs1 and second driven gear c2, the first driven shifter cs1 and third driven gear c3, and the second driven shifter cs2 and first driven gear c1. The first drive shifter ms1, first driven shifter cs1, and second driven shifter cs2 move in the axial direction (lateral direction) from a neutral state in FIG. 3 where the dog clutches D are not engaged, and engage the dog clutches D with the adjacent free gears m4, m5, c1, c2, c3, to thereby establish first to fifth speeds of the transmission 41.

Fork grooves m3a, c4a, c5a with which tip end portions 71d, 72d, 73d of later-mentioned shift forks 71, 72, 73 engage are formed along the circumferential direction, on outer surfaces of the first drive shifter ms1, first driven shifter cs1, and second driven shifter cs2, respectively.

Also referring to FIG. 2, a starter drive gear 35a, which is supported to a starter shaft 35 to be rotatable relative thereto, also meshes with the first driven gear c1, so that a kick start-pressing force can be transmitted to the crankshaft 21.

A drive sprocket 36 is fitted into a left end part of the counter shaft 44, which extends to the left from the left transmission case half body 40L. An endless chain 37 is wound around the drive sprocket 36 and a driven sprocket (not shown) fitted into a rear wheel shaft (not shown).

A hydraulic clutch 47 is provided on a right end part of the main shaft 42, which extends to the right from the right transmission case half body 40R. A primary driven gear 48 meshing with the primary drive gear 34 is provided integrally with a clutch outer 47a of the hydraulic clutch 47. The right unit case cover 11R covers the right of the hydraulic clutch 47.

Next, the shift control mechanism 50 for controlling speeds of the transmission 41 will be described.

Figure 4:
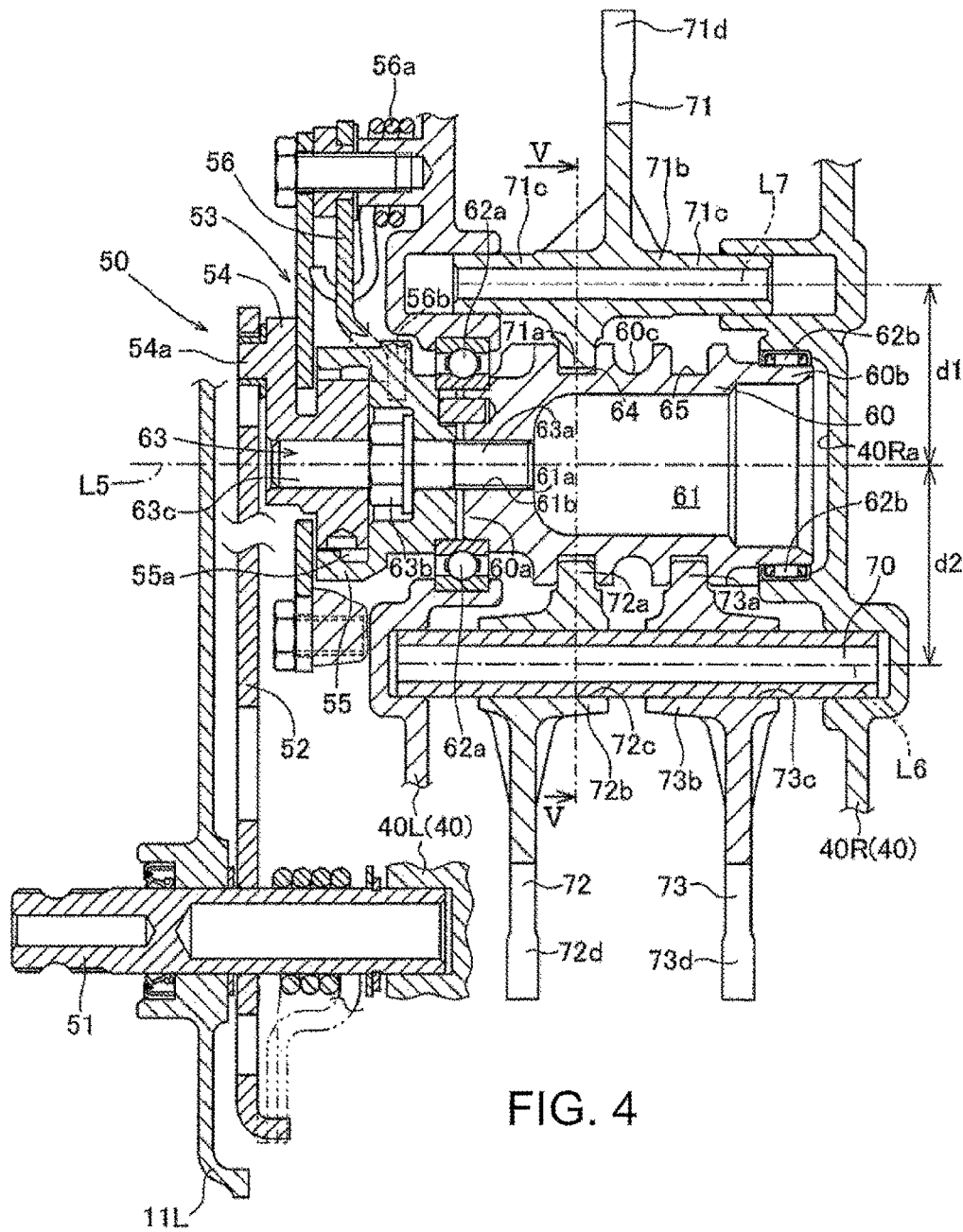
FIG. 4 is a cross-sectional view taken along line IV-IV of FIG. 1.

As shown in FIG. 4, the shift control mechanism 50 includes a shift spindle 51, a master arm 52, a ratchet and pawl mechanism 53 as a shift drum feed mechanism, a shift drum 60, and the shift forks 71, 72, 73. The shift control mechanism 50 switches speeds of the transmission 41, by rotating the shift spindle 51 to intermittently rotate the shift drum 60 through the master arm 52 and the ratchet and pawl mechanism 53, and thereby moving the shift forks 71, 72, 73 to move the first drive shifter ms1, first driven shifter cs1, and second driven shifter cs2 of the transmission 41 in the axial direction. First to fifth speeds are set in the gearbox 4, and neutral is set between first and second speed.

The shift drum 60 is rotated at a predetermined feed angle $\alpha$ by the ratchet and pawl mechanism 53 as the shift drum feed mechanism, which will be described in detail later. Here, the "predetermined feed angle" mentioned in the specification and in the scope of claims is the angle $\alpha$ at which the shift drum 60 is intermittently rotated when shifting up (shifting down), as in FIG. 5, and is set to 60 degrees in the embodiment. Note that an angle at which the shift drum 60 rotates between first speed and neutral and between neutral and second speed, is set to 30 degrees, which is half the feed angle α of the shift drum 60.

As shown in FIG. 1, the shift control mechanism 50 is arranged on the lower side, i.e., one side of a plane P, which passes through the shaft axis L3 of the main shaft 42 and the shaft axis L4 of the counter shaft 44. When viewed in the axial direction of the shift drum 60, the shift spindle 51 is arranged below the counter shaft 44, the shift forks 71, 72, 73 are arranged below the main shaft 42 and counter shaft 44, and the shift drum 60 is arranged below the main shaft 42 and between the shift fork 71 and shift forks 72, 73.

As shown in FIG. 4, the shift spindle 51 is rotatably supported to the left transmission case half body 40L and the left unit case cover 11L. One end of the plate-shaped master arm 52 is fixed at the center in the axial direction of the shift spindle 51. The master arm 52 rotates integrally with the shift spindle 51. The other end of the master arm 52 is connected to the later-mentioned ratchet and pawl mechanism 53.

The three shift forks 71, 72, 73 are engaged with lead grooves 64, 65 in the shift drum 60. One lead groove 64 is a common lead groove 64 with which two shift forks 71, 72 are engaged, and the right lead groove 65 on the right side of the common lead groove 64 has only one shift fork 73 engaged therewith.

As shown in FIGS. 3 and 4, of the two shift forks 71, 72 engaged with and guided by the common lead groove 64, one is a drive side-shift fork 71 engaged with the fork groove m3a of the first drive shifter ms1, and the other is a first driven side-shift fork 72, which is a driven side-shift fork engaged with the fork groove c4a of the first driven shifter cs1. The common lead groove 64 has both of the drive side-shift fork 71 and driven side-shift fork 72 engaged therewith, and allows both of the drive gear and driven gear to be moved while being guided by a single lead groove.

The shift fork 73 engaged with and guided by the right lead groove 65 is a second driven side-shift fork 73, which is a driven side-shift fork engaged with the fork groove c5a of the second driven shifter cs2.

As shown in FIG. 4, the drive side-shift fork 71 has: a cylindrical base portion 71b; a tip end portion 71d extending toward the first drive shifter ms1 from the base portion 71b, and engaging with the fork groove m3a of the first drive shifter ms1; an engaging portion 71a extending toward a rotation center C1 of the shift drum 60 from the base portion 71b, and engaging with the common lead groove 64; and a shaft portion 71c extending laterally from both lateral ends of the base portion 71b, and concentric with and having substantially the same diameter as the base portion 71b. Each of the tip end portion 71d, engaging portion 71a, and shaft portion 71c is formed integrally with the base portion 71b.

As shown in FIG. 1, the shaft portion 71c of the drive side-shift fork 71 is arranged in the front obliquely upper direction of the shift drum 60, such that its shaft axis L7 is parallel to a rotation center line L5 of the shift drum 60. Moreover, as shown in FIG. 4, a left end part and right end part of the shaft portion 71c of the drive side-shift fork 71 are supported to the left transmission case half body 40L and right transmission case half body 40R, respectively, in an axially slidable manner.

Figure 5:
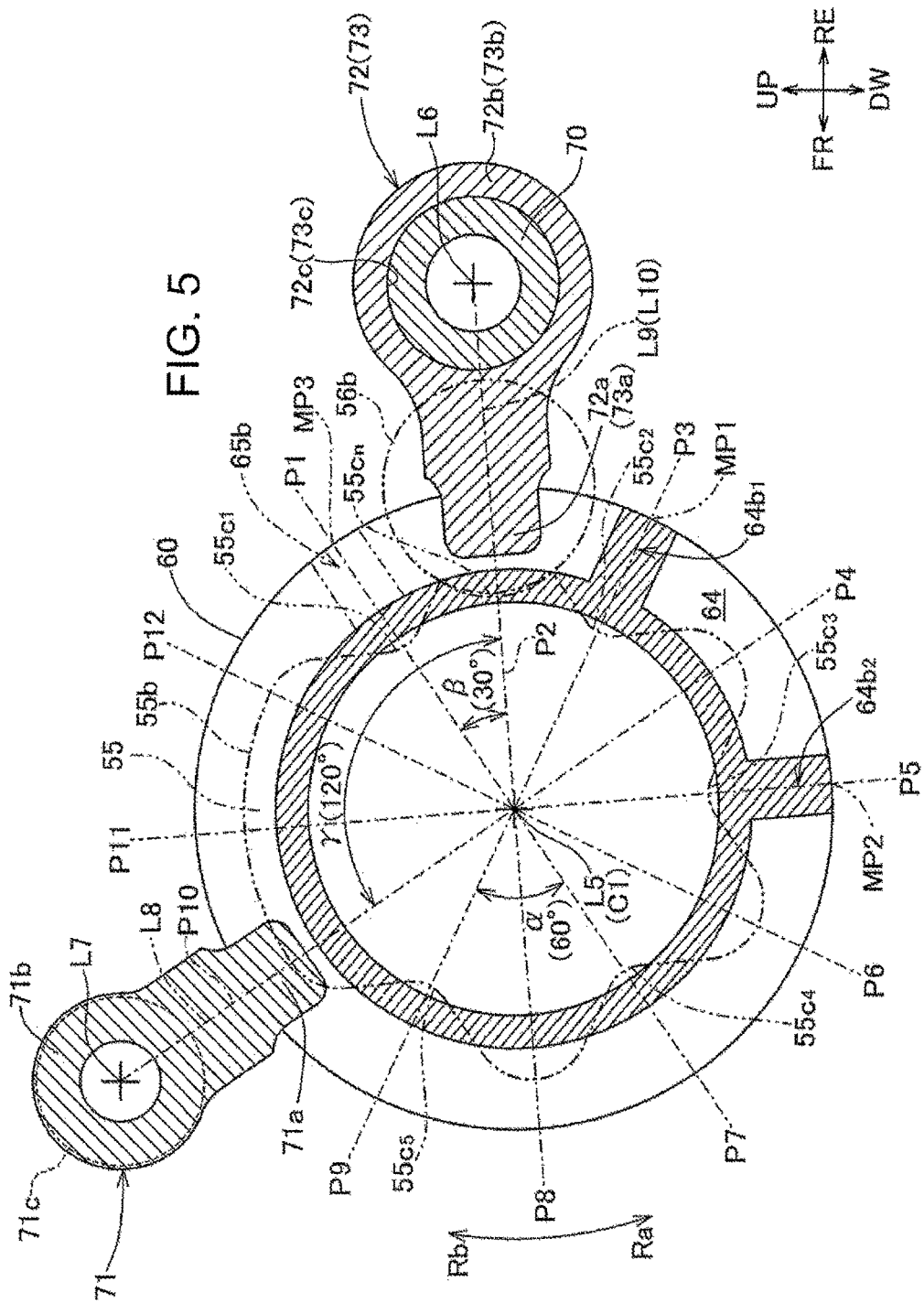
FIG. 5 is a schematic cross-sectional view, in which a line V-V section of FIG. 4 is partially omitted.

The engaging portion 71a of the drive side-shift fork 71 is formed into a cylindrical column, and, as shown in FIG. 5, is arranged such that a shaft axis L8 of the engaging portion 71a is perpendicular to the shaft axis L7 of the shaft portion 71c and the rotation center line L5 of the shift drum 60.

As shown in FIG. 4, the first driven side-shift fork 72 has: a cylindrical base portion 72b; a tip end portion 72d extending toward the first driven shifter cs1 from the base portion 72b, and engaging with the fork groove c4a of the first driven shifter cs1; and an engaging portion 72a extending toward the rotation center C1 of the shift drum 60 from the base portion 72b, and engaging with the common lead groove 64. The tip end portion 72d and engaging portion 72a are formed integrally with the base portion 72b.

Also, the second driven side-shift fork 73 has: a substantially cylindrical base portion 73b; a tip end portion 73d extending toward the second driven shifter cs2 from the base portion 73b, and engaging with the fork groove c5a of the second driven shifter cs2; and an engaging portion 73a extending toward the rotation center C1 of the shift drum 60 from the base portion 73b, and engaging with the right lead groove 65. Each of the tip end portion 73d and engaging portion 73a is formed integrally with the base portion 73b.

As shown in FIG. 1, a single shift fork shaft 70 is arranged in the rear obliquely upper direction of the shift drum 60, such that its axial direction is parallel to the rotation center C1 of the shift drum 60, and as shown in FIG. 4, its left end part and right end part are respectively fitted into the left transmission case half body 40L and right transmission case half body 40R, respectively, in an immovable manner.

A shaft insertion hole 72c and shaft insertion hole 73c into which the shift fork shaft 70 is inserted are provided, in the base portion 72b of the first driven side-shift fork 72 and the base portion 73b of the second driven side-shift fork 73, respectively. The first driven side-shift fork 72 and the second driven side-shift fork 73 are slidably supported to the shift fork shaft 70 in this order from the left, to be slidable in the axial direction of the shift fork shaft 70.

As shown in FIG. 5, the engaging portions 72a, 73a are respectively formed into cylindrical columns, and the first driven side-shift fork 72 and second driven side-shift fork 73 are arranged such that each of shaft axes L9, L10 of the engaging portions is perpendicular to a shaft axis L6 of the shift fork shaft 70 and the rotation center line L5 of the shift drum 60.

Figure 8:
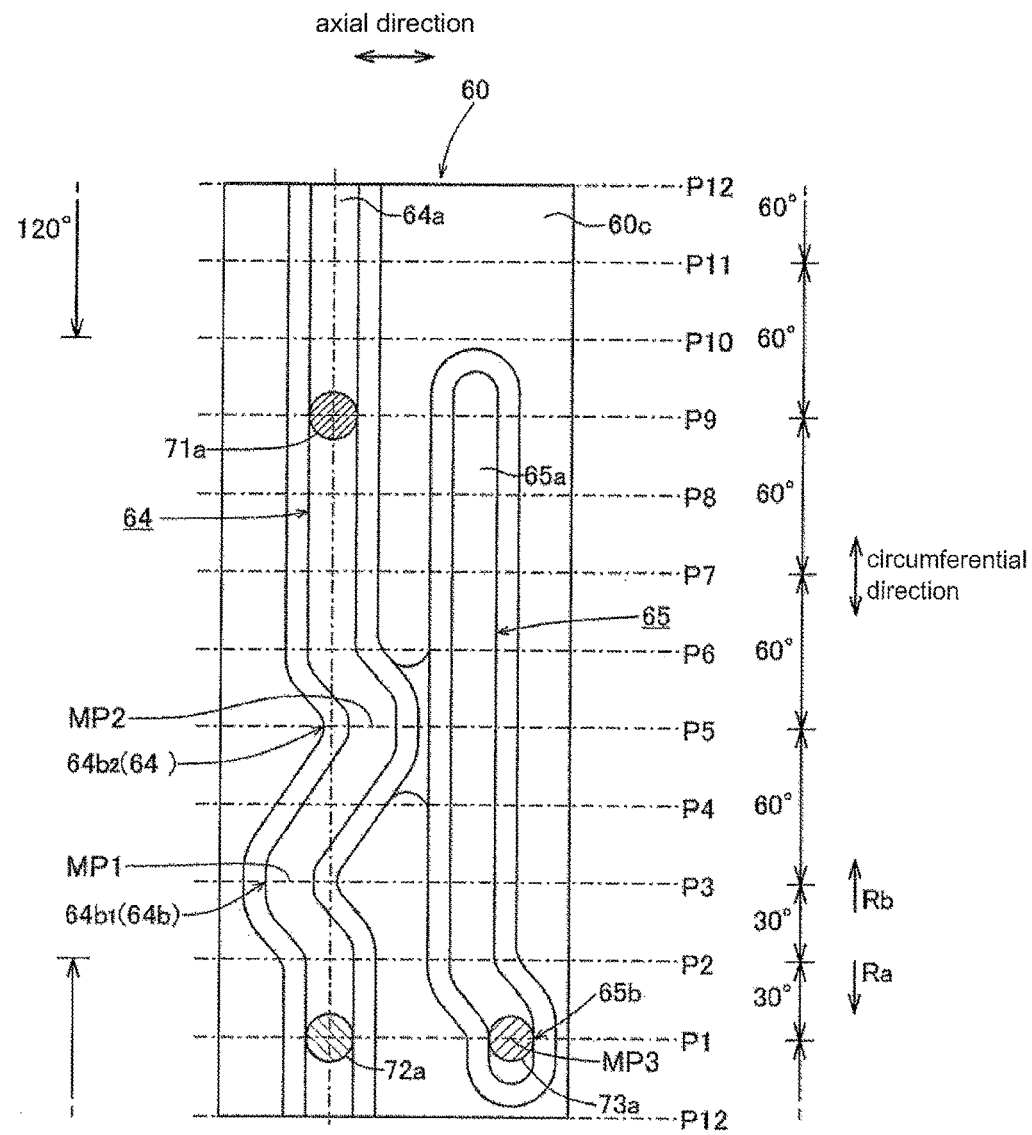
FIG. 8 is a development of the shift drum showing positions where the engaging portions are engaged in first speed.

As shown in FIGS. 5 and 8, the relative positions of the engaging portion 71a of the drive side-shift fork 71, the engaging portion 72a of the first driven side-shift fork 72, and the engaging portion 73a of the second driven side-shift fork 73 are set at an angular interval γ, which is 120 degrees, around the rotation center C1 of the shift drum 60. The angular interval is set to a positive integral multiple of the shift drum feed angle α, which is 60 degrees.

As shown in FIG. 4, the shift drum 60 with which these shift forks 71, 72, 73 are engaged is roughly formed into a bottomed cylinder, which is provided with a concave recess 61 opened to the right. A left end portion 60a of the shift drum 60 is rotatably supported to the left transmission case half body 40L through a ball bearing 62a as a bearing member, and a right end portion 60b of the shift drum is rotatably supported to the right transmission case half body 40R through a needle bearing 62b as a bearing member. In other words, the ball bearing 62a and the needle bearing 62b are arranged between a drum outer surface 60c of the shift drum 60, and an inner surface 40Ra of the transmission case 40. As shown in FIG. 1, the shift drum 60 is arranged inside the transmission case 40, such that its rotation center line L5 is parallel to the shaft axis L3 of the main shaft 42 and the shaft axis L4 of the counter shaft 44.

A bolt hole 61b, which penetrates into the left end portion 60a of the shift drum 60, is provided in a bottom portion 61a of the concave recess 61 of the shift drum 60, around the rotation center line L5 of the shift drum 60. An originally designed bolt 63 is screwed into the bolt hole 61b. The originally designed bolt 63 is formed of a male screw portion 63a and bolt head portion 63b, and a center shaft portion 63c extending axially from the male screw portion 63a to the opposite side thereof, with the bolt head portion 63b interposed therebetween.

Figure 7:
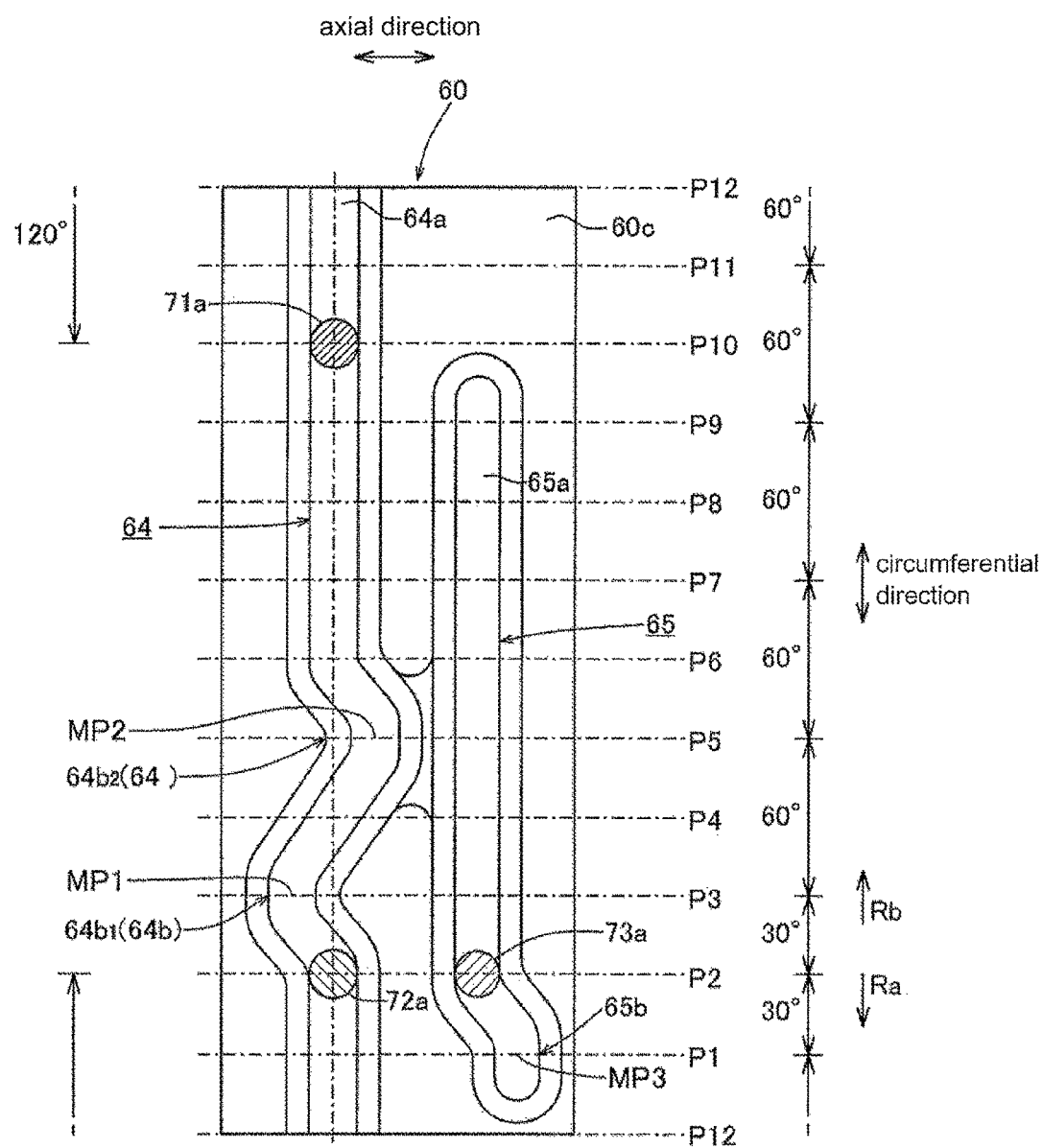
FIG. 7 is a development of a shift drum showing positions where engaging portions are engaged in a neutral state.

As shown in FIGS. 4 and 7, of the two lead grooves 64, 65 provided in the drum outer surface 60c of the shift drum 60, the common lead groove 64 is provided on the left side closer to the ratchet and pawl mechanism 53 (shift drum feed mechanism) in the axial direction of the shift drum 60, while the right lead groove 65 is provided on the right side of the common lead groove 64.

As shown in FIGS. 5 and 7, multiple shift positions are set on the drum outer surface 60c of the shift drum 60, at regular intervals in the circumferential direction. First shift position P1 to twelfth shift position P12 are set in the embodiment. The angular interval between the shift positions around the rotation center C1 of the shift drum 60, is set to a twelfth of a single rotation of the shift drum 60. In the embodiment, the angular interval is set to 30 degrees, which is half the feed angle α of the shift drum 60. Each of the engaging portions 71a, 72a, 73a is brought to one of the shift positions, when the shift drum 60 is fed intermittently and stopped by the ratchet and pawl mechanism 53.

Next, the shapes of the lead grooves 64, 65 will be described. As shown in FIG. 7, the lead grooves 64, 65 are respectively provided with: circumferential groove portions 64a, 65a extending in the circumferential direction of the shift drum 60; and angular axially shifted groove portions 64b, 65b, which are continuous with the circumferential groove portions 64a, 65a, and are shifted and protruding in the axial direction of the shift drum 60 from the circumferential groove portions 64a, 65a. The common lead groove 64 has two axially shifted groove portions, which are a first axially shifted groove portion $64b_1$, and a second axially shifted groove portion $64b_2$. The right lead groove 65 has a single axially shifted groove portion, which is the axially shifted groove portion 65b. Parts shifted farthest in the axial direction of the first axially shifted groove portion $64b_1$, second axially shifted groove portion $64b_2$, and axially shifted groove portion 65b are axial shift peak portions MP1, MP2, MP3, respectively, and they are axially shifted for equal amounts in the embodiment.

When the engaging portions 71a, 72a, 73a of the shift forks 71, 72, 73 are engaged with the circumferential groove portions 64a, 65a, the engaging portions are engaged in the middle in the width direction of the lead grooves 64, 65. Here, the first drive shifter ms1, first driven shifter cs1, and second driven shifter cs2 are in a neutral state where the dog clutches D are not engaged, as in FIG. 3.

When the engaging portions 71a, 72a, 73a of the shift forks 71, 72, 73 are engaged with the axially shifted groove portions 64b, 65b, the engaging portions are engaged at positions shifted in the axial direction from the circumferential groove portions 64a, 65a of the lead grooves 64, 65. When the engaging portions 71a, 72a, 73a are engaged with the axial shift peak portions MP1, MP2, MP3, the first drive shifter ms1, first driven shifter cs1, and second driven shifter cs2 as shifters are moved in the axial direction of the main shaft 42 and counter shaft 44 as indicated by a chain double-dashed line in the FIG. 12, and if there are gears to be engaged adjacent to the shifters, the shifters are engaged with the dog clutches D.

As shown in FIG. 7, the common lead groove 64 is formed continuously on the outer surface of the shift drum 60. Of the common lead groove 64, an area from a sixth shift position P6 to a second shift position P2 through the twelfth shift position P12 of the shift drum 60 is the circumferential groove portion 64a, which is a middle position where the dog clutch D is not engaged. Also, an area from the second shift position P2 to a fourth shift position P4 is the first axially shifted groove portion $64b_1$, which is shifted to the left side in the axial direction, while an area from the fourth shift position P4 to the sixth shift position P6 is the second axially shifted groove portion $64b_2$, which is shifted to the right side in the axial direction. The axial shift peak portion MP1 shifted farthest in the axial direction in the first axially shifted groove portion $64b_1$ is formed in a third shift position P3, and the axial shift peak portion MP2 shifted farthest in the axial direction in the second axially shifted groove portion $64b_2$ is formed in a fifth shift position P5.

Moreover, as shown in FIGS. 5 and 7, the engaging portion 71a of the drive side-shift fork 71 and the engaging portion 72a of the first driven side-shift fork 72 are engaged with the common lead groove 64, such that their shaft axes L8 and L9 form the angular interval γ, which is a positive multiple integral of the predetermined feed angle α of the shift drum 60 around the rotation center C1 of the shift drum 60. In the embodiment, the angular interval is set to 120 degrees, which is twice the feed angle of the shift drum 60, which is 60 degrees.

The right lead groove 65 is provided continuously from the first shift position P1 to a ninth shift position P9. Here, an area from the first shift position P1 to the second shift position P2 is the axially shifted groove portion 65b, which is shifted to the right side in the axial direction, and an area from the second shift position P2 to the ninth shift position P9 is the circumferential groove portion 65a, which is a middle position where the dog clutch D is not engaged. Furthermore, the axial shift peak portion MP3 shifted farthest in the axial direction in the axially shifted groove portion 65b is formed in the first shift position P1.

Also, as shown in FIGS. 5 and 7, the engaging portion 73a of the second driven side-shift fork 73 is engaged with the right lead groove 65, such that its shaft axis L10 and the shaft axis L9 of the engaging portion 72a of the first driven side-shift fork 72 overlap with each other, when viewed in the axial direction of the shift drum 60.

As shown in FIG. 4, the ratchet and pawl mechanism 53 as the shift drum feed mechanism for intermittently feeding the shift drum 60 configured as above is provided, on the left of the shift drum 60.

The ratchet and pawl mechanism 53 includes: a shift member 54 in which a driven protrusion 54a slidably fitted to the master arm 52 is formed; a drum center 55 rotating integrally with the shift drum 60; paired pawls (not shown) incorporated in the drum center 55, and energized to engage with the inner circumference of the drum center 55; and a stopper arm 56. The drum center 55 is attached to the left end portion 60a of the shift drum 60, with the originally designed bolt 63. The shift member 54 holds the paired pawls such that they can freely rise and fall inside a housing 55a of the drum center 55, and is rotatably attached to the center shaft portion 63c of the originally designed bolt 63.

As simply indicated by a chain double-dashed line in FIG. 5, when viewed in the axial direction of the shift drum 60, six engaging concave portions 55c recessed in arc shapes toward the rotation center C1 of the shift drum 60 are provided, on an outer surface 55b of the drum center 55. At the rotation center C1 of the shift drum 60, bottom parts of respective engaging concave portions $55c_1$ to $55c_5$ are provided at the angular interval of the feed angle α of the shift drum 60, which is 60 degrees in the embodiment. A neutral engaging concave portion $55c_n$ is provided in the middle between the engaging concave portion $55c_1$ and an engaging concave portion $55c_2$. The engaging concave portion $55c_1$, neutral engaging concave portion $55c_n$, and engaging concave portion $55c_2$ are provided at the angular interval β, which is half the feed angle α of the shift drum 60 and is 30 degrees in the embodiment, around the rotation center C1 of the shift drum 60.

Also referring to FIG. 4, a roller 56b on the tip end of the stopper arm 56 energized by a spring 56a, is pressed against the outer surface 55b of the drum center 55. The roller 56b is pushed over a peak portion between the engaging concave portions 55c by rotation of the drum center 55, and fits into the adjacent engaging concave portion 55c. This stops the rotation of the drum center 55, and positions the shift drum 60 to each speed.

The ratchet and pawl mechanism 53 configured in the above manner operates as follows. First, rotation of the master arm 52 rotates the shift member 54, which is guided by the driven protrusion 54a, in one direction. This raises the tip end of one pawl and locks it onto the drum center 55, and the drum center 55 rotates in response to the movement of the shift member 54. Then, the roller 56b of the stopper arm 56 engages with one of the engaging concave portions 55c to stop the rotation of the drum center 55, and the shift drum 60 is rotated intermittently. The shift drum 60 is sequentially fed from first to fifth speed at the predetermined feed angle α (60 degrees), and is fed and positioned between first speed and neutral, and between neutral and second speed at β (30 degrees), which is half of α.

The ratchet and pawl mechanism 53 rotates the shift drum 60 in two directions, which are a normal direction Ra and a reverse direction Rb, around the rotation center C1. When the shift drum 60 rotates in the normal direction Ra, the speed of the transmission 41 increases from first, to second, third, fourth, and fifth in this order (hereinafter, the increase in speed is referred to as "shift up"), and when the shift drum 60 rotates in the reverse direction Rb, the speed of the transmission 41 decreases from fifth, to fourth, third, second, and first in this order (hereinafter, the decrease in speed is referred to as "shift down"). Note that in the embodiment, shifting up and shifting down do not include shifting from neutral to first speed, first speed to neutral, neutral to second speed, and second speed to neutral.

Operations of the gearbox 4 will be described with reference to FIGS. 5 to 12. FIGS. 7 to 12 show states where the engaging portions 71a, 72a, 73a of the shift forks 71, 72, 73 are engaged with the lead grooves 64, 65 of the shift drum 60. FIG. 7 shows a neutral state of the gearbox 4, and FIGS. 8 to 12 show first to fifth speed of the gearbox.

When the roller 56b on the tip end of the stopper arm 56 is engaged with the neutral engaging concave portion $55c_n$ of the drum center 55 and the shift drum 60 is positioned as in FIG. 5, the engaging portion 71a of the drive side-shift fork 71 is in a tenth shift position P10 of the common lead groove 64, and the engaging portion 72a of the first driven side-shift fork 72 is in the second shift position P2 of the common lead groove 64, so that the engaging portion 72a and the engaging portion 73a are engaged in the circumferential groove portion 64a, as in FIG. 7. Also, the engaging portion 73a of the second driven side-shift fork 73 is in the second shift position P2 of the right lead groove 65, and is engaged with the circumferential groove portion 65a. Since the engaging portions 71a to 73a are positioned in the circumferential groove portions 64a, 65a, the first drive shifter ms1, first driven shifter cs1, and second driven shifter cs2 are in positions indicated by a solid line in FIG. 6, and the speed of the transmission 41 is neutral.

When the shift drum 60 is fed 30 degrees in the reverse direction Rb from the neutral state of the transmission 41, the roller 56b is engaged with the engaging concave portion $55c_1$ of the drum center 55 and positions the shift drum 60, and as in FIG. 8, the engaging portion 71a of the drive side-shift fork 71 and the engaging portion 72a of the first driven side-shift fork 72 move inside the circumferential groove portion 64a, so that the first drive shifter ms1 and first driven shifter cs1 are kept unengaged. The engaging portion 73a of the second driven side-shift fork 73 is moved to the right side by the axially shifted groove portion 65b, and the second driven side-shift fork 73 engages the second driven shifter cs2 with the first driven gear c1. Thus, first speed of the transmission 41 is established.

Figure 9:
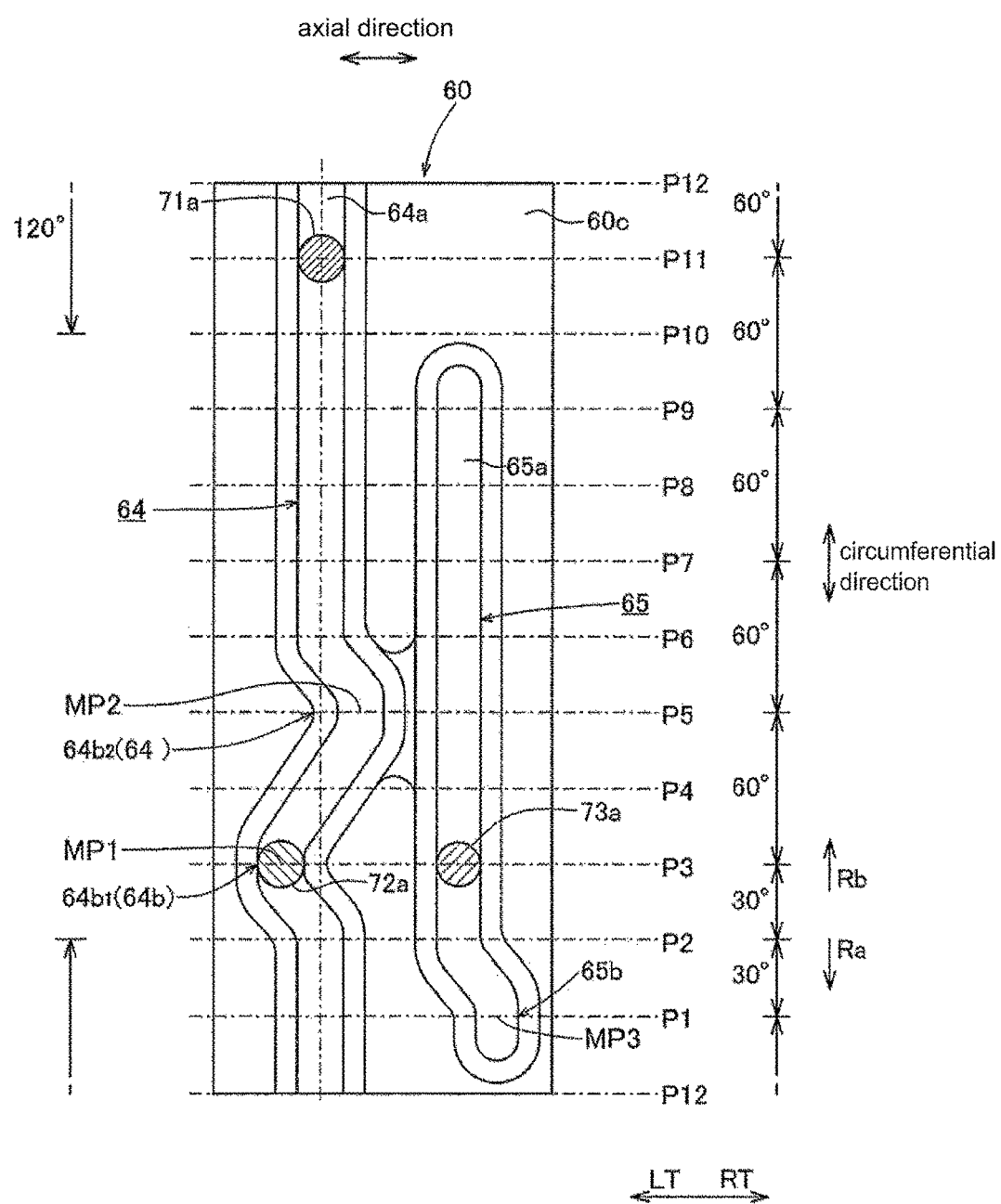
FIG. 9 is a development of the shift drum showing positions where the engaging portions are engaged in second speed.

When the shift drum 60 is fed 60 degrees in the normal direction Ra from first speed of the transmission 41, the roller 56b is engaged with the engaging concave portion $55c_2$ of the drum center 55 and positions the shift drum 60, and as in FIG. 9, the engaging portion 71a of the drive side-shift fork 71 moves inside the circumferential groove portion 64a, so that the first drive shifter ms1 is kept unengaged. The engaging portion 72a of the first driven side-shift fork 72 is moved to the left side by the first axially shifted groove portion $64b_1$, and the first driven side-shift fork 72 engages the first driven shifter cs1 with the second driven gear c2. The engaging portion 73a of the second driven side-shift fork 73 is engaged with the circumferential groove portion 65a, so that the second driven shifter cs2 is disengaged from the first driven gear c1. Thus, second speed of the transmission 41 is established.

Figure 10:
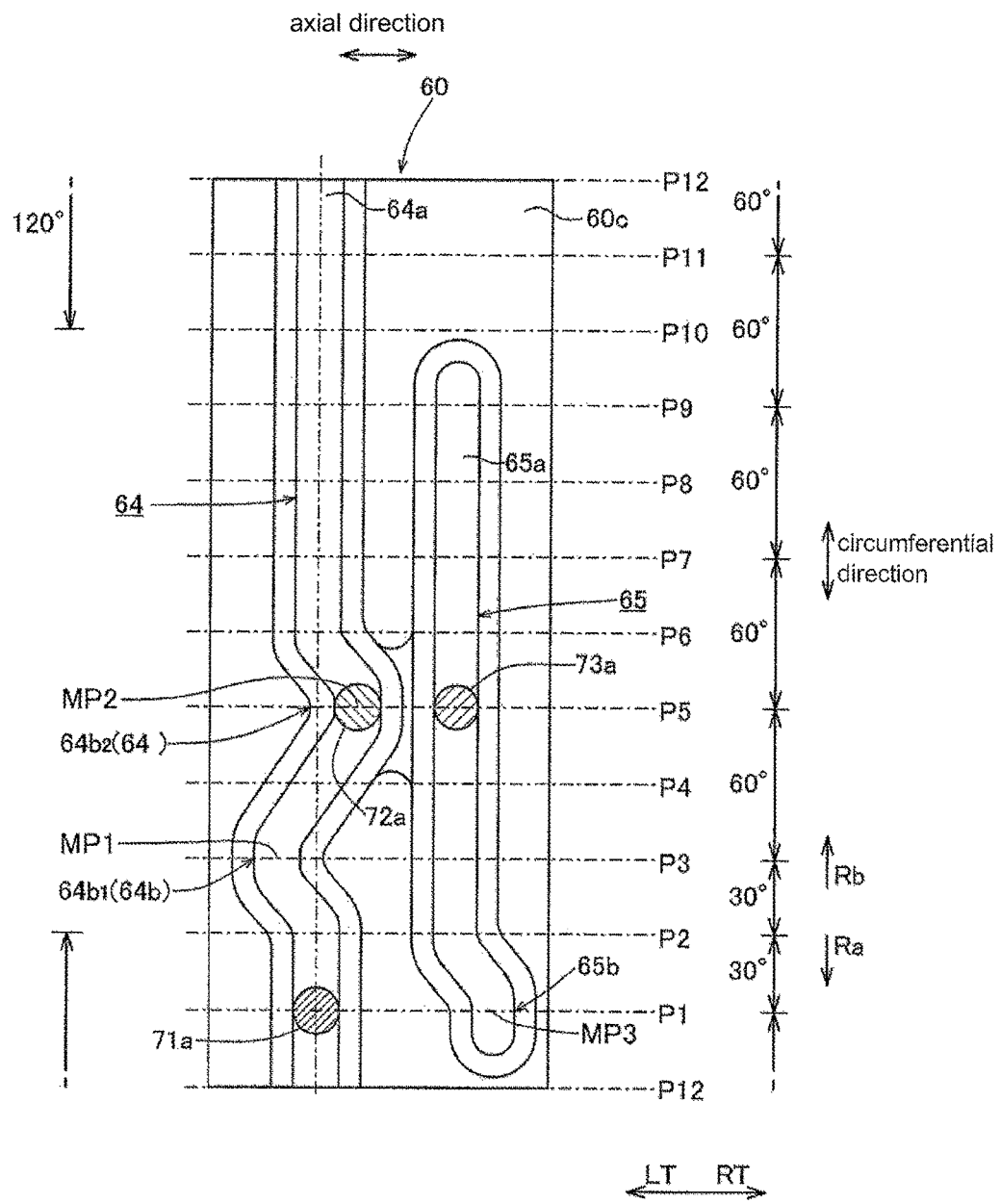
FIG. 10 is a development of the shift drum showing positions where the engaging portions are engaged in third speed.

When the shift drum 60 is fed 60 degrees in the normal direction Ra from second speed of the transmission 41, the roller 56b is engaged with the engaging concave portion $55c_3$ of the drum center 55 and positions the shift drum 60, and as in FIG. 10, the engaging portion 71a of the drive side-shift fork 71 moves inside the circumferential groove portion 64a, so that the first drive shifter ms1 is kept unengaged. The engaging portion 72a of the first driven side-shift fork 72 is moved to the right side by the second axially shifted groove portion $64b_2$, the first driven side-shift fork 72 is moved to the right side, and the first driven side-shift fork 72 disengages the first driven shifter cs1 from the second driven gear c2 and engages it with the third driven gear c3. The engaging portion 73a of the second driven side-shift fork 73 moves inside the circumferential groove portion 65a, so that the second driven shifter cs2 is kept unengaged. Thus, third speed of the transmission 41 is established.

Figure 11:
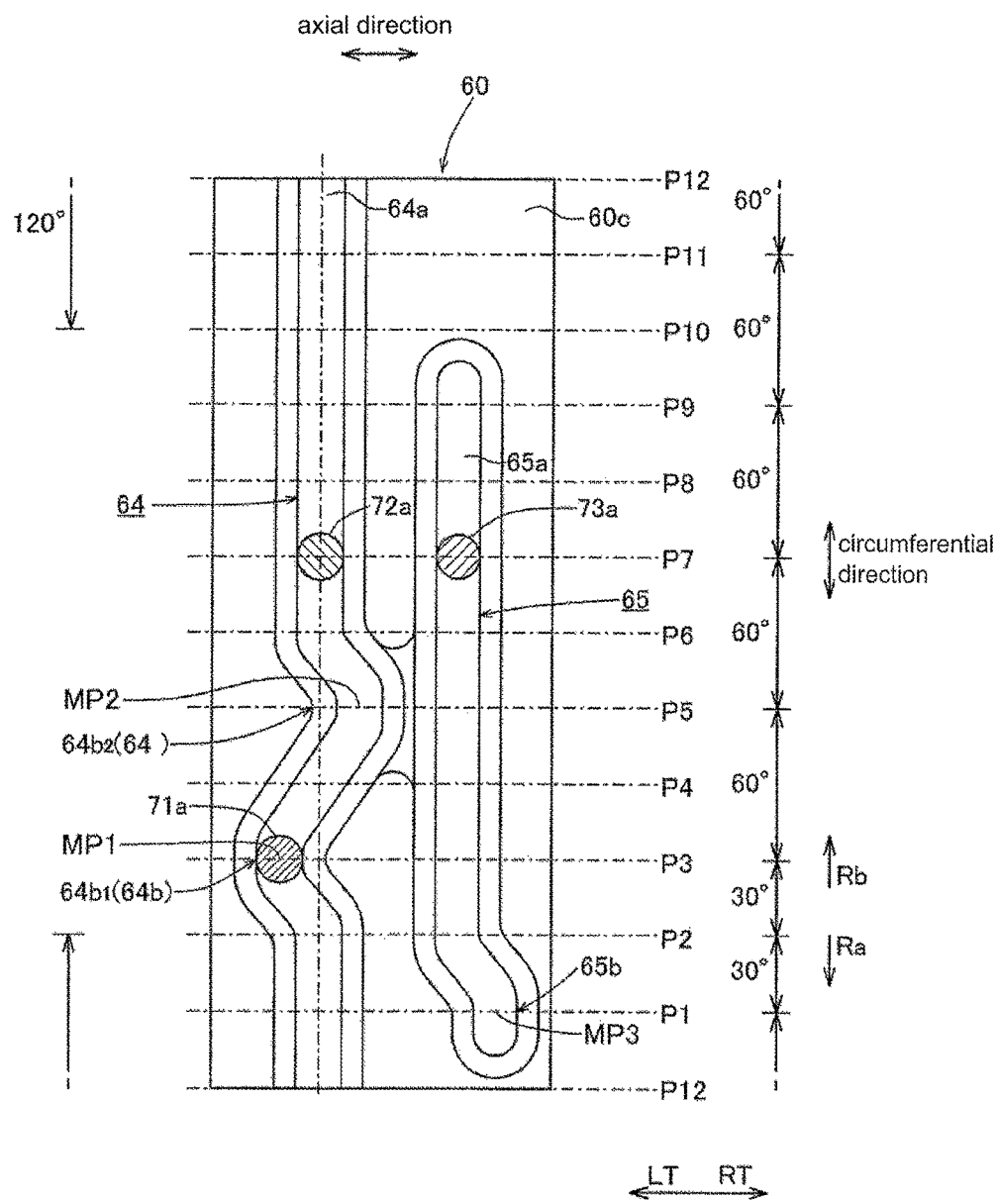
FIG. 11 is a development of the shift drum showing positions where the engaging portions are engaged in fourth speed.

When the shift drum 60 is fed 60 degrees in the normal direction Ra from third speed of the transmission 41, the roller 56b is engaged with an engaging concave portion $55c_4$ of the drum center 55 and positions the shift drum 60, and as in FIG. 11, the engaging portion 71a of the drive side-shift fork 71 is moved to the left side by the first axially shifted groove portion $64b_1$, and the drive side-shift fork 71 engages the first drive shifter ms1 with the fourth drive gear m4. The engaging portion 72a of the first driven side-shift fork 72 is moved to the circumferential groove portion 64a, so that the first driven shifter cs1 is disengaged from the third driven gear c3 and is unengaged. The engaging portion 73a of the second driven side-shift fork 73 moves inside the circumferential groove portion 65a, so that the second driven shifter cs2 is kept unengaged. Thus, fourth speed of the transmission 41 is established.

Figure 12:
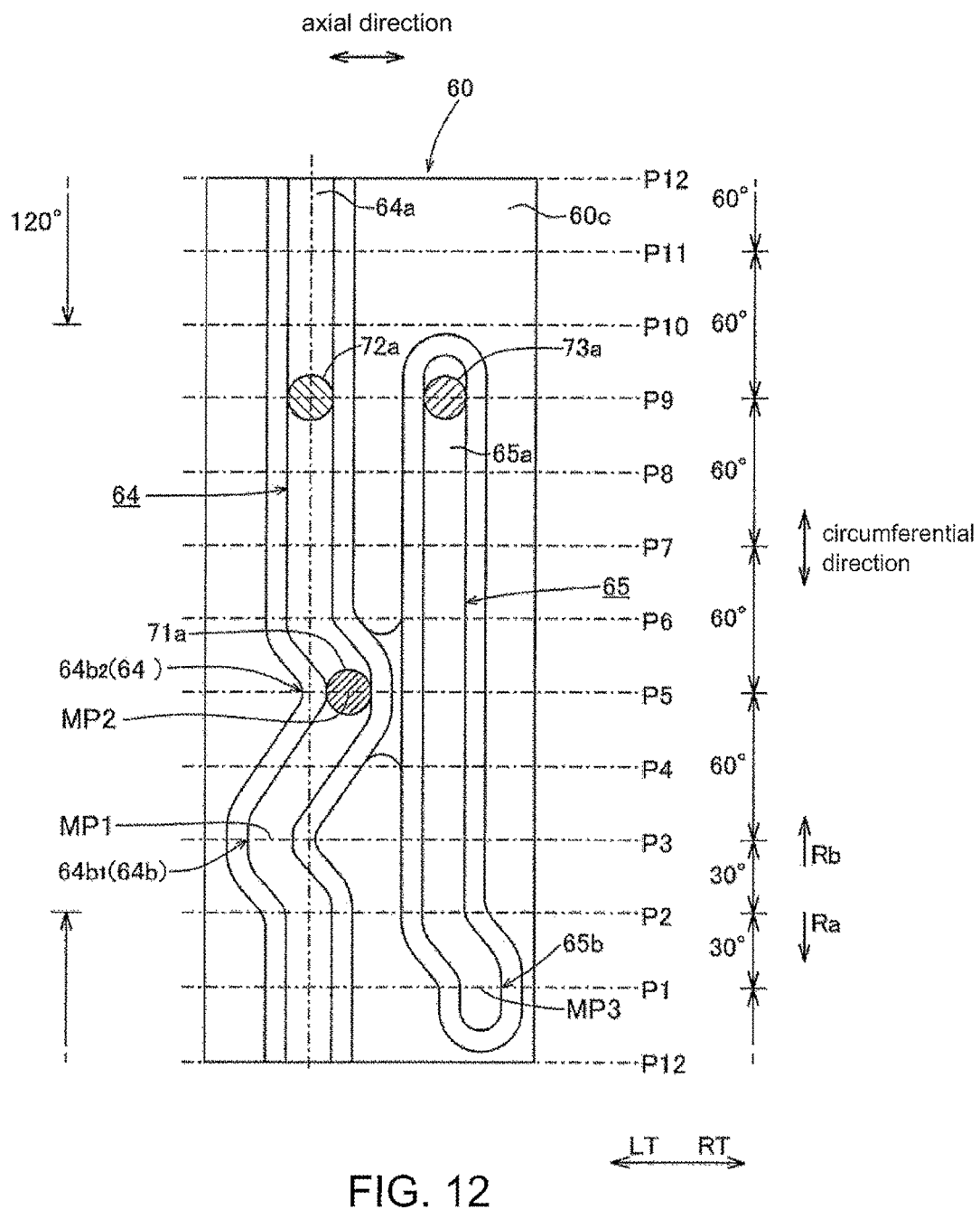
FIG. 12 is a development of the shift drum showing positions where the engaging portions are engaged in fifth speed.

When the shift drum 60 is fed 60 degrees in the normal direction Ra from fourth speed of the transmission 41, the roller 56b is engaged with the engaging concave portion $55c_5$ of the drum center 55 and positions the shift drum 60, and as in FIG. 12, the engaging portion 71a of the drive side-shift fork 71 is moved to the right side by the second axially shifted groove portion $64b_2$, and the drive side-shift fork 71 disengages the first drive shifter ms1 from the fourth drive gear m4, and engages it with the fifth drive gear m5. The engaging portion 72a of the first driven side-shift fork 72 moves inside the circumferential groove portion 64a, so that the first drive shifter ms1 is kept unengaged. The engaging portion 73a of the second driven side-shift fork 73 moves inside the circumferential groove portion 65a, so that the second driven shifter cs2 is kept unengaged. Thus, fifth speed of the transmission 41 is established.

Hereinabove, the description has been given by using operations in the shift-up direction of the transmission 41 as an example. Operations in the shift-down direction of the transmission 41 are performed by driving the gears reversely.

Thus, rotation of the shift drum 60 in normal and reverse directions Ra, Rb at the predetermined feed angle α allows the engaging portions 71a, 72a, 73a to be guided by the lead grooves 64, 65, and move to the circumferential groove portions 64a, 65a, and the axially shifted groove portions $64b_1$, $64b_2$, 65b. Then, the shift forks 71, 72, 73 are moved in the axial direction to move one of the first drive shifter ms1, first driven shifter cs1, and second driven shifter cs2, which engages or releases the dog clutch D to establish each speed of the transmission 41.

Figure 6:
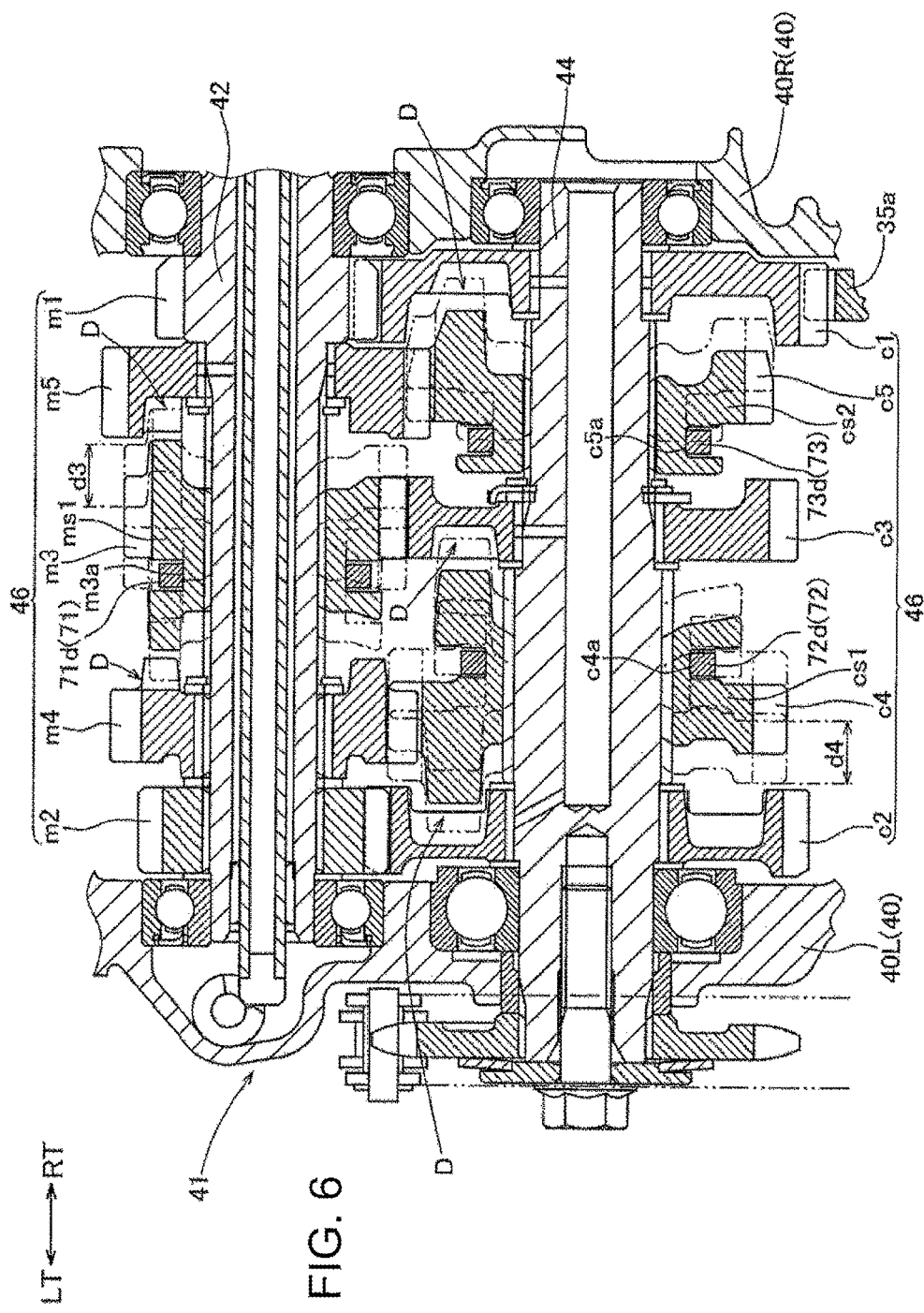
FIG. 6 is an enlarged cross-sectional view of a state where a drive shifter and a driven shifter are moved in FIG. 3.

As mentioned earlier, the drive side-shift fork 71 and the first driven side-shift fork 72 are moved to the left by the first axially shifted groove portion $64b_1$ in the common lead groove 64, and are moved to the right by the second axially shifted groove portion $64b_2$. Hence, as shown in FIG. 6, the first drive shifter ms1 with which the drive side-shift fork 71 engages, and the first driven shifter cs1 with which the first driven side-shift fork 72 engages move in the same axial direction, and move for equal distances d3, d4.

Since two shift forks (drive side-shift fork 71 and first driven side-shift fork 72 in the embodiment) are thus moved by a common axially shifted groove portion 64b (first axially shifted groove portion $64b_1$ and second axially shifted groove portion $64b_2$ in the embodiment), two shifters (first drive shifter ms1 and first driven shifter cs1 in the embodiment) can be moved in the same direction for equal distances. Hence, the gear group 46 takes up less space in the axial direction, than a case where two shifters move in different directions. Also, the axial length of the transmission 41 can be shortened to downsize the gearbox 4.

The gearbox of the power unit of the embodiment of the present invention, which has been described in detail, has the following effects.

In the gearbox 4 of the power unit of the embodiment, the engaging portions 71a, 72a of the two shift forks 71, 72 are engaged with a single common lead groove 64, so that the number of lead grooves of the shift drum 60 can be reduced, and the axial length of the shift drum 60 can be shortened. Moreover, in this configuration, speeds of the transmission 41 are established by sharing a single first axially shifted groove portion $64b_1$ of a single common lead groove 64 between both engaging portions 71a, 72a of the two shift forks 71, 72, and also sharing the other second axially shifted groove portion $64b_2$ between both engaging portions 71a, 72a of the two shift forks 71, 72. This eliminates the need to provide separate axially shifted groove portions for each of the shift forks 71, 72 in the common lead groove 64. Hence, the circumferential length of the common lead groove 64 can be shortened, and the diameter of the shift drum 60 can be reduced, whereby the shift drum 60 can be downsized to downsize the gearbox 4 and power unit 1.

Also, according to this configuration, the first drive shifter ms1 and the first driven shifter cs1 are guided by the same first axially shifted groove portion $64b_1$ to be respectively engaged with the fourth drive gear m4 and second driven gear c2, which are adjacent to the respective shifters in the same axial direction (left), and are also guided by the same second axially shifted groove portion $64b_2$ to be respectively engaged with the fifth drive gear m5 and third driven gear c3, which are adjacent to the respective shifters in the same axial direction (right). Hence, the first drive shifter ms1 and the first driven shifter cs1 move within the same area in the axial direction, so that the axial length of the gear group 46 can be kept short and the axial length of the transmission 41 can be shortened, whereby the shift drum 60 can be downsized to downsize the gearbox 4 and power unit 1 even more.

Furthermore, the ratchet and pawl mechanism 53 as the shift drum feed mechanism is arranged on the left side, which is one side in the direction of the rotation axis of the shift drum 60, and the common lead groove 64 is provided on the left side closer to the ratchet and pawl mechanism 53 than the right lead groove 65, in the axial direction of the shift drum 60. Hence, the distance between the ratchet and pawl mechanism 53 and the common lead groove 64, on which a large load is applied due to engaging of multiple engaging portions 71a, 72a, is reduced. This reduces torsional stress of the shift drum 60, and suppresses thickness of the shift drum 60, whereby the shift drum 60 can be made lighter, and the click stop feeling during the shifting operation can be improved.

The gearbox 4 of the power unit includes the transmission case 40, and the shift drum 60 has the drum outer surface 60c of both end portions 60a, 60b in the shift drum axis direction, which are rotatably supported to the inner surface of the transmission case 40 through the ball bearing 62a and needle bearing 62b as bearing members. Hence, there is no need to provide a separate supporting part in the shift drum 60, so that the shift drum 60 can be downsized even more, and the gearbox 4 and power unit 1 can be downsized even more.

Furthermore, the drive side-shift fork 71, which is one of the drive side-shift fork 71 and the driven side-shift forks 72, 73, has the shaft portion 71c formed integrally with the engaging portion 71a, and the shaft portion 71c supports the drive side-shift fork 71 directly. Hence, the need for a shift fork shaft is eliminated, and a distance d1 between the shaft axis L7 of the shaft portion 71c and the rotation center line L5 of the shift drum 60 can be made shorter, than a distance d2 between the shaft axis L6 of the shift fork shaft 70 and the rotation center line L5 of the shift drum 60. With this, the drive side-shift fork 71 can be arranged close to the shift drum 60, and the drive side-shift fork 71 does not require space for inserting a shift fork shaft. Accordingly, the drive side-shift fork 71 itself can be downsized, and the gearbox 4 and power unit 1 can be downsized even more.

Although the embodiment of the present invention has been described with reference to FIGS. 1 to 12, embodiments are not limited to the contents of the description. The invention is also applicable to internal combustion engines other than a water-cooled type, internal combustion engines other than a single-cylinder type, and internal combustion engines other than a four-stroke type, for example, and changes can be made without departing from the gist of the invention.

For example, the number of lead grooves and shift forks is not limited to that of the embodiment, and various combinations may be adopted, such as three lead grooves and four shift forks, and a single lead groove and two shift forks.

In the embodiment, the third drive gear m3 is provided in the first drive shifter ms1, the fourth driven gear c4 is provided in the first driven shifter cs1, and the fifth driven gear c5 is provided in the second driven shifter cs2. However, a configuration may be adopted, in which some of the shifters have no gears provided therein, or none of the shifters have gears provided therein.

Although the transmission 41 of the embodiment is configured to have five speeds, a configuration including other speeds (e.g., sixth speed), or a configuration including reverse may be adopted. Also, the feed angle $\alpha$ of the shift drum 60 may be appropriately changed (e.g., 30 degrees), according to the number of speeds.

The angular interval $\gamma$ at which the two engaging portions 71a, 72a engaged with the common lead groove 64 are engaged may be set arbitrarily, as long as it is a positive multiple integral of the feed angle $\alpha$ of the shift drum 60, and therefore may be equal to or thrice the feed angle, for example. Note, however, that the angular interval $\gamma$ is limited within 180 degrees.

Also, although operations between neutral and first speed have not been included in the shift-up and shift-down operations, these may be included in the shift-up and shift-down operations, depending on the configuration of the transmission 41.

The embodiment adopts a configuration, in which both two of the first axially shifted groove portion $64b_1$ and second axially shifted groove portion $64b_2$ in the common lead groove 64 are shared for both of the movement of the drive side-shift fork 71, and the movement of the first driven side-shift fork 72. However, it suffices that at least one axially shifted groove portion 64b be shared for both of the movement of the drive side-shift fork 71 and the movement of the first driven side-shift fork 72 in the configuration. Accordingly, a configuration may be adopted, in which the first drive shifter ms1 and the first driven shifter cs1 move in the same direction, only in one direction.

Although the shaft portion 71c is provided in the drive side-shift fork 71 in the embodiment, it may be provided in the driven side-shift forks 72, 73. Also, a configuration may be adopted, in which the shaft portion 71c is not provided in the drive side-shift fork 71, and the drive side-shift fork 71 is supported to a shift fork shaft.

DESCRIPTION OF REFERNCE SYMBOLS

1 . . . power unit, 4 . . . gearbox, 40 . . . transmission case, 40Ra . . . inner surface, 41 . . . transmission, 42 . . . main shaft, 44 . . . counter shaft, 53 . . . ratchet and pawl mechanism, 60 . . . shift drum, 60a . . . left end portion, 60b . . . right end portion, 60c . . . outer surface, 64 . . . common lead groove, 64a . . . circumferential groove portion, $64b_1$ . . . first axially shifted groove portion, $64b_2$ . . . second axially shifted groove portion, 65 . . . right lead groove, 65a . . . circumferential groove portion, 65b . . . axially shifted groove portion, 70 . . . shift fork shaft, 71 . . . drive side-shift fork, 71a . . . engaging portion, 71c . . . shaft portion, 72 . . . first driven side-shift fork, 72a . . . engaging portion, 73 . . . second driven side-shift fork, 73a . . . engaging portion, m1 to m5 . . . drive gear, ms1 . . . first drive shifter, c1 to c5 . . . driven gear, cs1 . . . first driven shifter, cs2 . . . second driven shifter, C1 . . . rotation center (shift drum), D . . . dog clutch, d1 . . . distance (L7-L5), d2 . . . distance (L6-L5), L3 . . . shaft axis (main shaft), L4 . . . shaft axis (counter shaft), L5 . . . rotation center line (shift drum), L6 . . . shaft axis (shift fork shaft), L7 . . . shaft axis (shaft portion of shift fork), P . . . plane, $\alpha$ . . . feed angle of shift drum, $\gamma$ . . . angular interval

What is claimed is:

1. A gearbox of a power unit comprising:
    a constant mesh transmission including a main shaft, a counter shaft having a shaft axis arranged parallel to a shaft axis of said main shaft, a plurality of drive gears provided on said main shaft, and a plurality of driven gears meshing with said plurality of drive gears and provided on said counter shaft;
    a cylindrical shift drum having lead grooves formed on a drum outer surface, and having a rotation center line arranged parallel to said shaft axis of said main shaft and said shaft axis of said counter shaft;
    a shift drum feed mechanism for rotating said shift drum at a predetermined feed angle;
    a drive shifter provided on said main shaft in such a manner as to be movable in the axial direction of said main shaft, and freely engageable with and disengageable from at least one of said drive gears adjacent thereto, among said drive gears;
    driven shifters provided on said counter shaft in such a manner as to be movable in the axial direction of said counter shaft, and freely engageable with and disengageable from at least one of said driven gears adjacent thereto, among said driven gears;
    a drive side-shift fork having an engaging portion engaging with said lead groove, and guided by said lead groove to move said drive shifter in the axial direction of said main shaft; and
    driven side-shift forks having engaging portions engaging with said lead groove, and guided by said lead grooves to move said driven shifters in the axial direction of said counter shaft, wherein:
    said drive side-shift fork and said driven side-shift forks are arranged on one side of a plane, which passes through said shaft axis of said main shaft and said shaft axis of said counter shaft;
    said shift drum is arranged between said drive side-shift fork and said driven side-shift forks when viewed in the axial direction of said shift drum;
    said lead grooves include circumferential groove portions extending in the circumferential direction of said shift drum, and axially shifted groove portions continuous with said circumferential groove portions, and shifted in the axial direction of said shift drum from said circumferential groove portions;
    at least one of said lead grooves is a common lead groove, with which said drive side-shift fork and said driven side-shift fork are engaged;
    said engaging portion of said drive side-shift fork and said engaging portion of said driven side-shift fork engaged with said common lead groove are engaged at an angular interval, which is a positive multiple integral of said feed angle, with respect to a rotation center of said shift drum; and
    said drive side-shift fork engaged with said common lead groove and said driven side-shift fork engaged with said common lead groove are guided by the same said axially shifted groove portion of said axially shifted groove portions, and thereby establish speeds of said transmission.

2. The gearbox of a power unit according to claim 1, wherein:
   of said drive shifters, said drive shifter, which is moved by said drive side-shift fork engaged with said common lead groove, is guided by said axially shifted groove portion provided in said common lead groove, and is engaged with said drive gear adjacent thereto on one side in the axial direction of said main shaft; and
   of said driven shifters, said driven shifter, which is moved by said driven side-shift fork engaged with said common lead groove, is guided by the same said axially shifted groove portion as said axially shifted groove portion that guides said drive shifter, and is engaged with said driven gear adjacent thereto in the same direction as said one side in the axial direction of said main shaft, in the axial direction of said counter shaft.

3. The gearbox of a power unit according to claim 2, wherein:
   said shift drum feed mechanism is arranged on one side in the axial direction of said shift drum; and
   said common lead groove is provided closer to said shift drum feed mechanism than the other said lead groove, in the axial direction of said shift drum.

4. The gearbox of a power unit according to claim 3, wherein:
   said gearbox of a power unit comprises a case member accommodating said transmission, said shift drum, said shift drum feed mechanism, said drive side-shift fork, and said driven side-shift forks;
   said shift drum has both end parts in the axial direction of the shift drum rotatably supported to said case member through a bearing member; and
   said bearing member is arranged between said drum outer surface of said shift drum and an inner surface of said case member.

5. The gearbox of a power unit according to claim 1, wherein
   at least one of said drive side-shift fork and said driven side-shift forks is formed integrally with said engaging portion, and has a shaft portion supported in an axially slidable manner.

6. The gearbox of a power unit according to claim 2, wherein
   at least one of said drive side-shift fork and said driven side-shift forks is formed integrally with said engaging portion, and has a shaft portion supported in an axially slidable manner.

7. The gearbox of a power unit according to claim 3, wherein
   at least one of said drive side-shift fork and said driven side-shift forks is formed integrally with said engaging portion, and has a shaft portion supported in an axially slidable manner.

8. The gearbox of a power unit according to claim 4, wherein
   at least one of said drive side-shift fork and said driven side-shift forks is formed integrally with said engaging portion, and has a shaft portion supported in an axially slidable manner.

* * * * *